(12) United States Patent
Lo

(10) Patent No.: US 6,810,731 B1
(45) Date of Patent: Nov. 2, 2004

(54) REFINED LIQUID LEVEL DETECTOR STRUCTURE

(76) Inventor: Jui-Yang Lo, No. 2, Alley 27, Lane 143, Yuanshan Rd., Junghe City, Taipei (TW)

(*) Notice: Subject to any disclaimer, the term of this patent is extended or adjusted under 35 U.S.C. 154(b) by 0 days.

(21) Appl. No.: 10/603,825

(22) Filed: Jun. 26, 2003

(51) Int. Cl.$^7$ ............................................. G01F 23/00
(52) U.S. Cl. .................. 73/290 R; 73/304 R; 73/866.5
(58) Field of Search .......................... 73/290 R, 866.5, 73/304 R

(56) References Cited

U.S. PATENT DOCUMENTS

| | | | | |
|---|---|---|---|---|
| 4,594,892 A | * | 6/1986 | Asmundsson | 73/304 C |
| 5,481,911 A | * | 1/1996 | Liang | 73/313 |
| 5,624,047 A | * | 4/1997 | Challberg et al. | 212/350 |
| 5,718,146 A | * | 2/1998 | Liang | 73/319 |
| 6,007,776 A | * | 12/1999 | Matsumoto | 422/68.1 |
| 6,609,823 B2 | * | 8/2003 | Kraus et al. | 374/131 |

* cited by examiner

Primary Examiner—Hezron Williams
Assistant Examiner—Rodney Frank
(74) Attorney, Agent, or Firm—Rosenberg, Klein & Lee

(57) ABSTRACT

A refined liquid level detector structure is provided. The structure includes a liquid level detecting element and a telescopic external casing, wherein the liquid level element includes a circuit device, a holder and a probe, and the probe and the circuit device are respectively set on opposite facets of the holder. Moreover, the telescopic external casing is assembled by plural tubes that are sleeved on each other, and each tube has inclined openings averagely mounted thereon. The length of the external casing can be adjusted to subject to that of the probe and the external casing can be fixedly secured to the holder to be an organic whole. Furthermore, when the liquid level detector is putted in a measuring trough for detecting, the length of the external casing can be adjusted to match with that of the trough. In addition, through the structure described above, foreign particles can be effectively stopped outside the external casing so that the liquid level detecting element can has a best performance.

7 Claims, 8 Drawing Sheets

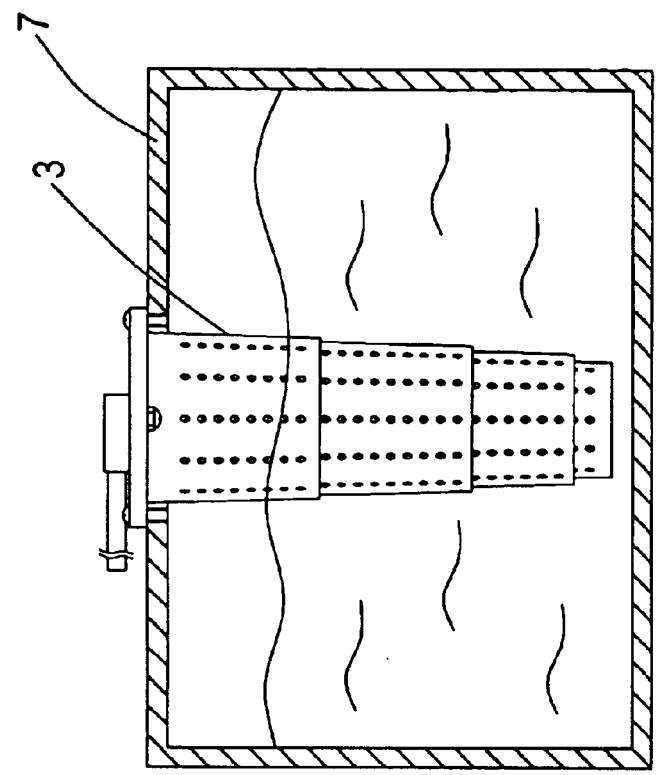
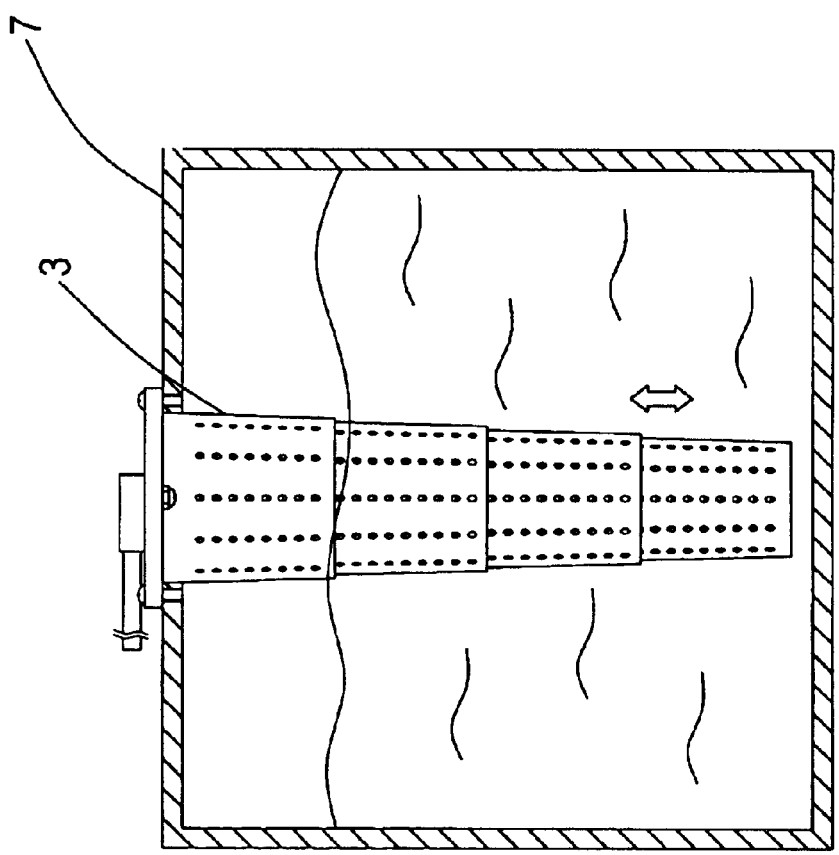
FIG. 4(a)
FIG. 4(b)

REFINED LIQUID LEVEL DETECTOR STRUCTURE

BACKGROUND OF THE INVENTION

1. Field of the Invention

The present invention relates to a refined liquid level detector structure, and more particularly to a refined liquid level detector structure whose length can be adjusted according to a length of a liquid level detecting element or a size of a measuring trough.

2. Description of the Prior Art

A conventional liquid level detector structure is illustrated in U.S. Pat. No. 5,718,146. The main characteristic of the structure is that a casing is assembled by plural cylinders through locking or securing, the casing is fixedly secured to a holder of a liquid level detecting element to surround a probe therein, and the casing has plural apertures disturbed thereon to block passages of waste particles and avoid the detecting element from being damaged. However, the main defect of this structure is that the length of the probe of the detecting element is determined by a depth of the cesspool, and thus the detecting element has all kinds of length standards. As to the structure of the cited reference, the casing has to conform to the length of the probe, and therefore the user has to assemble plural cylinders together. But, because the length of each cylinder is different, the user has to determine the length of the casing himself through measuring that of the probe and then assemble different cylinders to achieve the length of the casing. However, it still cannot guarantee that the length of the casing can exactly match with that of the probe so that it is still inconvenient for the user. Furthermore, for the manufacturer or the retailer, many different kinds of cylinders have to be fabricated or displayed for providing choices for the user to assemble. Therefore, it will increase loadings of processing and cost for the manufacturer and pressures of displaying and stocking for the retailer.

Thus, it can be seen, the prior art described above still has some defects, is not a good design, however, and is urgently to be improved.

Because of the technical defects of described above, the applicant keeps on carving unflaggingly to develop a refined liquid level detector structure through wholehearted experience and research.

SUMMARY OF THE INVENTION

An object of the present invention is to provide a refined liquid level detector structure including an external casing which has a telescopic structure and is assembled by plural tubes sleeving on each other so that the user can adjust it to accommodate to a length of a probe.

Another object of the present invention is to provide a refined liquid level detector structure whose external casing has inclined openings averagely mounted thereon to stop foreign particles from entering thereof and avoid the probe of the liquid level detector from being damaged. And further, when being washed, the washing liquid therein can be easily discharged.

Another further object of the present invention is to provide a refined liquid level detector structure which can be matched with all kinds of probe-type liquid level detectors.

Additional object of the present invention is to provide a refined liquid level detector structure which can solve difficulties of assembling for the user, loadings of processing and cost for the manufacturer, and pressures of displaying and stocking for the retailer.

For achieving the purposes described above, the hardware packing case structure according to the present invention includes a liquid level detecting element and a telescopic external casing, wherein the liquid level element includes a circuit device, a holder and a probe, and the probe and the circuit device are respectively set on opposite facets of the holder. Moreover, the telescopic external casing is assembled by plural tubes that are sleeved on each other, and each tube has inclined openings averagely mounted thereon. The length of the external casing can be adjusted to subject to that of the probe and the external casing can be fixedly secured to the holder to be an organic whole. Furthermore, when the liquid level detector is putted in a measuring trough for detecting, the length of the external casing can be adjusted to match with that of the trough. In addition, through the structure described above, foreign particles can be effectively stopped outside the external casing so that the liquid level detecting element can has a best performance.

BRIEF DESCRIPTION OF THE DRAWINGS

The drawings disclose an illustrative embodiment of the present invention which serves to exemplify the various advantages and objects hereof, and are as follows:

FIGS. 4(a)—(b) are practicing view showing the refined liquid level detector structure;

DETAILED DESCRIPTION OF THE PREFERRED EMBODIMENT

Figure 1:
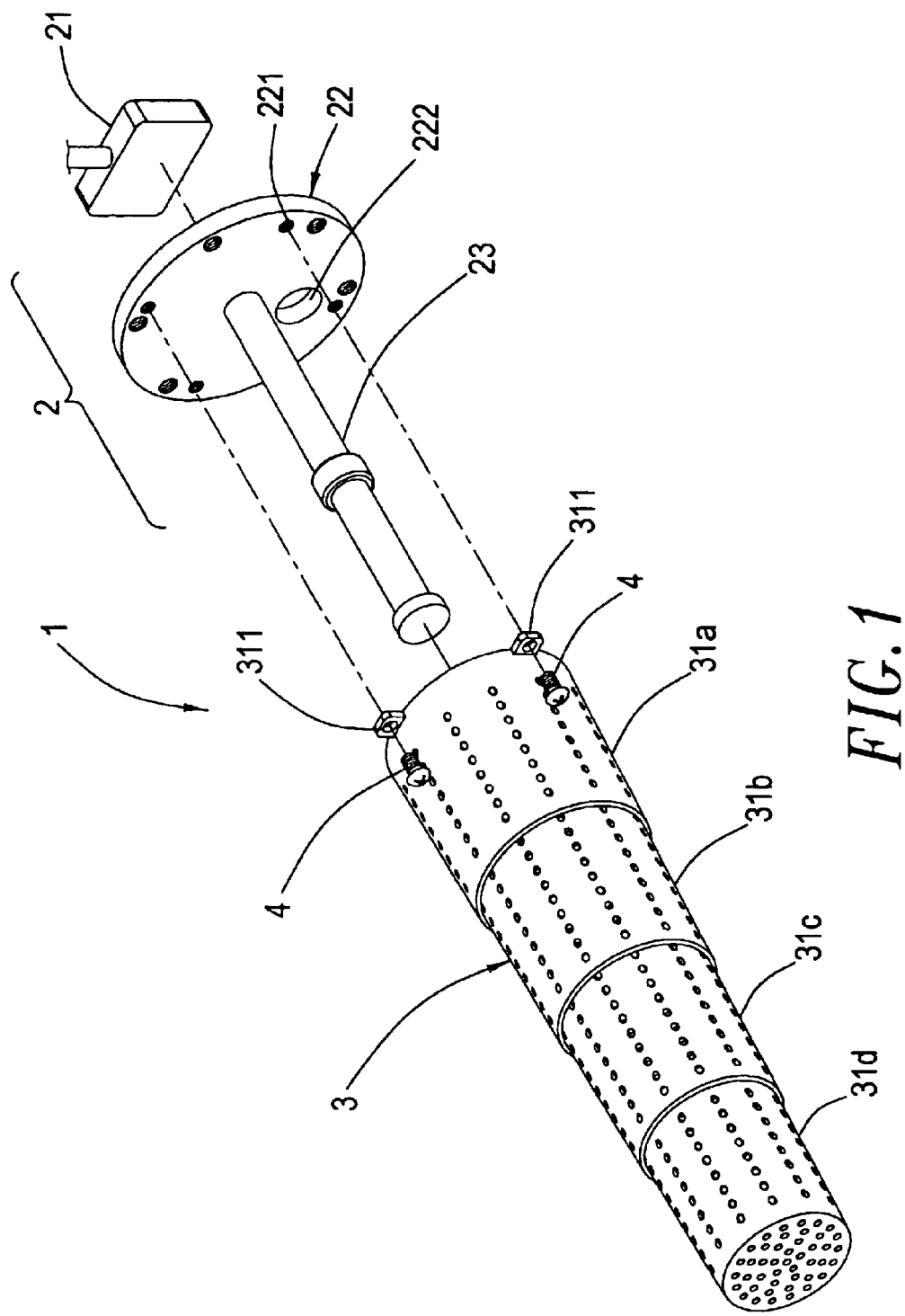
FIG. 1 is a decomposition view showing a refined liquid level detector structure according to the present invention.

Please refer to FIG. 1 which illustrates a decomposition view of the refined liquid level detector structure according to the present invention. As show in FIG. 1, the refined liquid level detector structure 1 according to the present invention includes a liquid level detecting element 2 and a telescopic external casing 3, wherein the liquid level element 2 includes a circuit device 21, a holder 22 and a probe 23. The holder 22 has plural fixing tapped holes 221 and a water inlet 22 mounted thereon, and further, the probe 23 is set on one facet of the holder 22 and the circuit device 21 is set on the other facet thereof. Moreover, the telescopic external casing 3 is assembled by plural tubes 31a, 31b, 31c, 31d which are sleeved on each other. In addition, plural lugs 311 are set on the external tube 31a for passing therethrough a screw 4 which is fixedly secured to the fixing tapped hole 221 of the holder 22 so that the holder 22 and the external casing 3 are assembled as one.

Figure 2B:
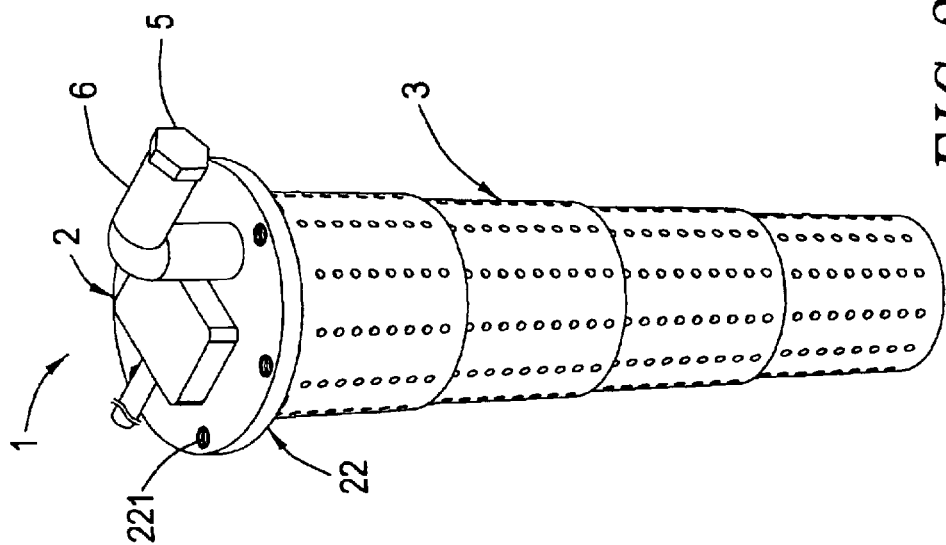
FIGS. 2(a)—(b) are dimensionally schematic views showing the refined liquid level detector structure.
Figure 2A:
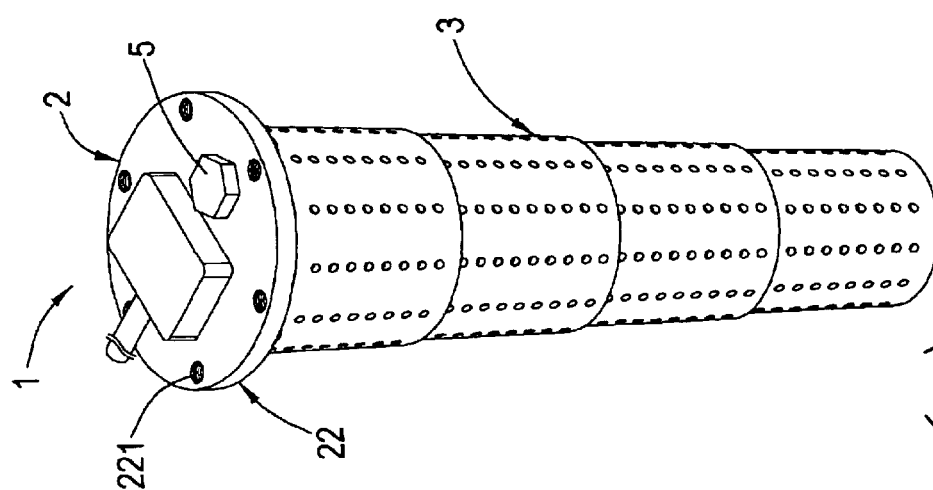

Please refer FIGS. 2(a)—2(b) which illustrates a dimensionally schematic view of the refined liquid level detector structure. As shown in FIGS. 2(a)—2(b), after the liquid detecting element 2 is assembled with the external casing 3, the refined liquid level detector structure 1 according to the present invention is accomplished. Besides, the holder 22 has plural tapped holes set thereon for being secured by screws 221, and the water inlet on the top thereof also can be secured by a screw 5. When the user intends to wash the probe of the liquid level detecting element 2, the water inlet can be connected to a conduit with the screw 5, and when the screw 5 is replaced by a water pipe, the washing can be proceeded.

Figure 3:
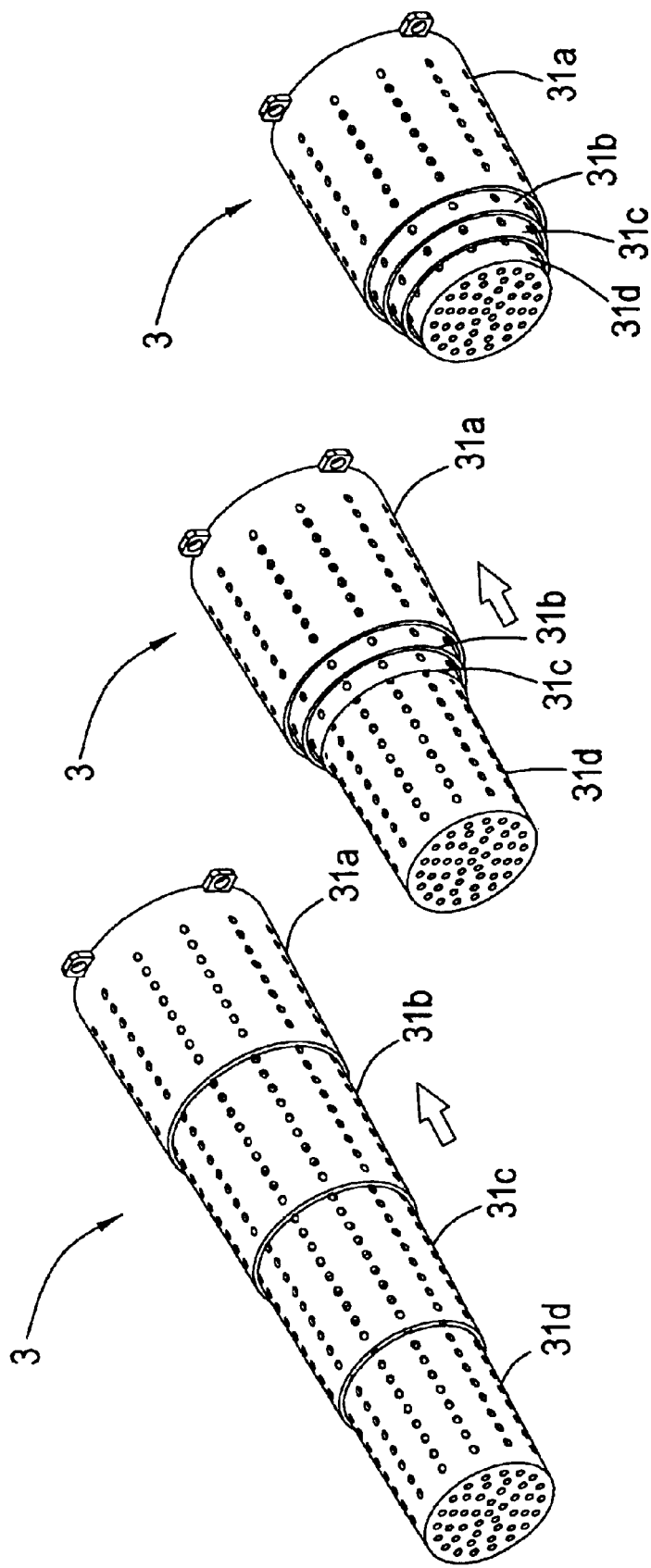
FIG. 3 is a schematic view showing the adjusting of an external casing of the refined liquid level detector structure.

Please refer to FIG. 3 which illustrates a schematic view showing the adjusting of the casing of the refined liquid level detector structure. As show in FIG. 3, the external casing 3 is assembled by plural tubes 31a, 31b, 31c and 31d, which are sleeved on each other. Therefore, the length of the casing 3 can be adjusted to subject to the length of the probe.

Please refer to FIGS. 4(a)—(b) which illustrate practicing views of the refined liquid level detector structure. As shown in FIGS. 4(a)—(b), because the external casing 3 is adjustable, it can be applied to a measuring trough 7 with different sizes. The user can choose a probe having an appropriate size corresponding to that of the measuring trough 7 to assemble with the adjustable external casing 3 so as to be used for detecting a liquid level within the measuring trough 7.

Figure 5:
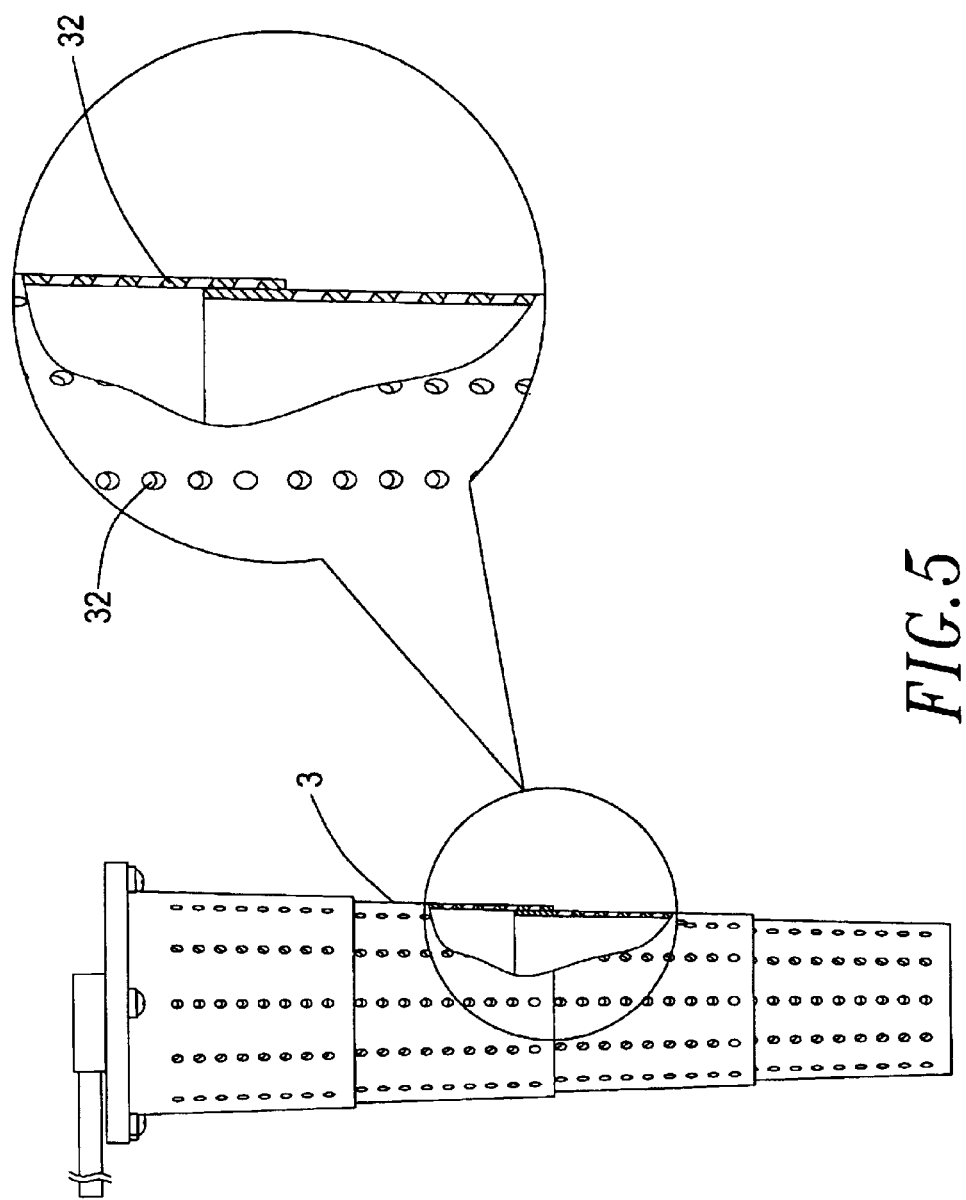
FIG. 5 is a magnifying view showing a portion of the refined liquid level detector structure.
Figure 6:
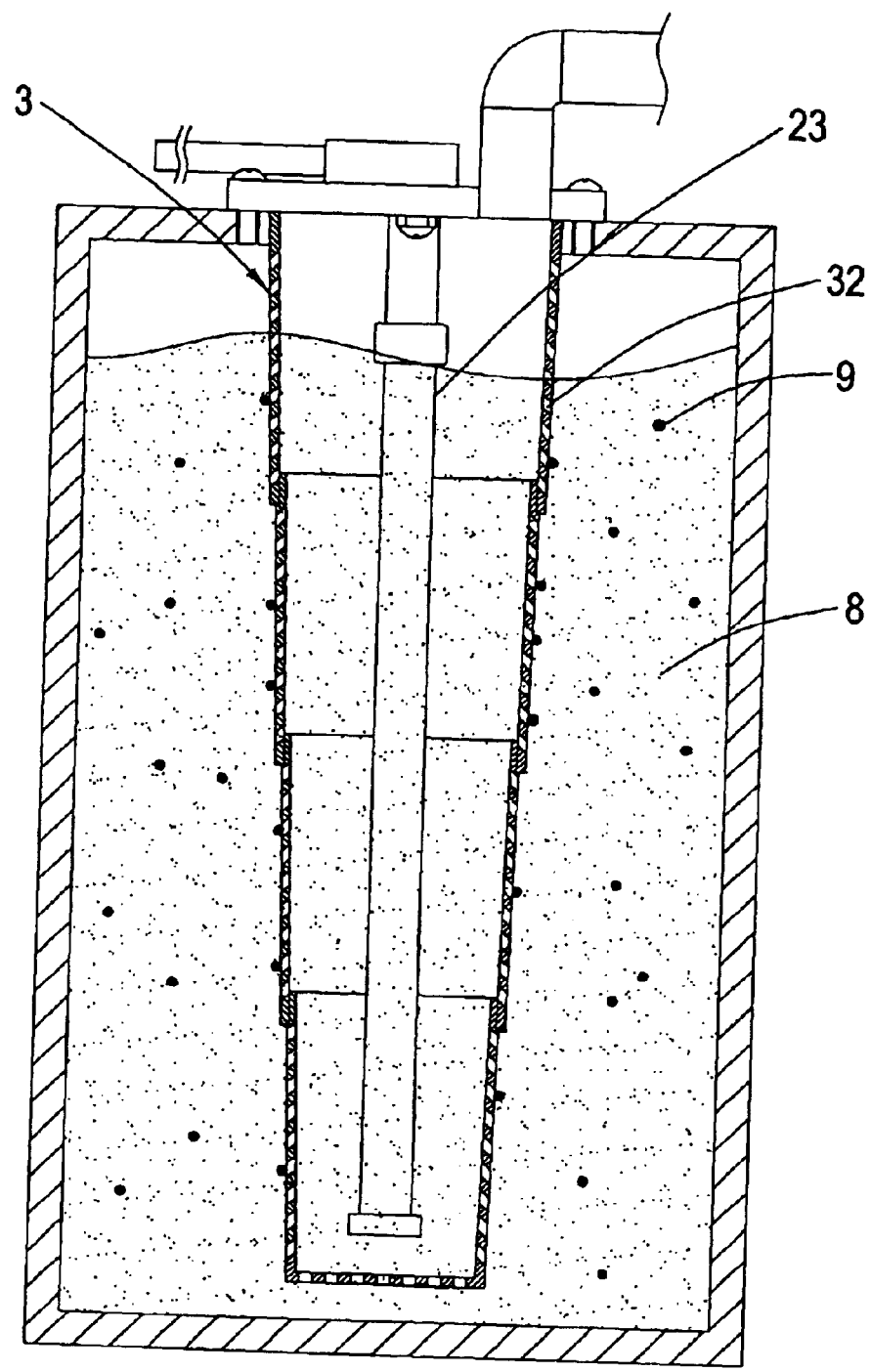
FIG. 6 is a practicing view showing the refined liquid level detector structure when under detecting.
Figure 7:
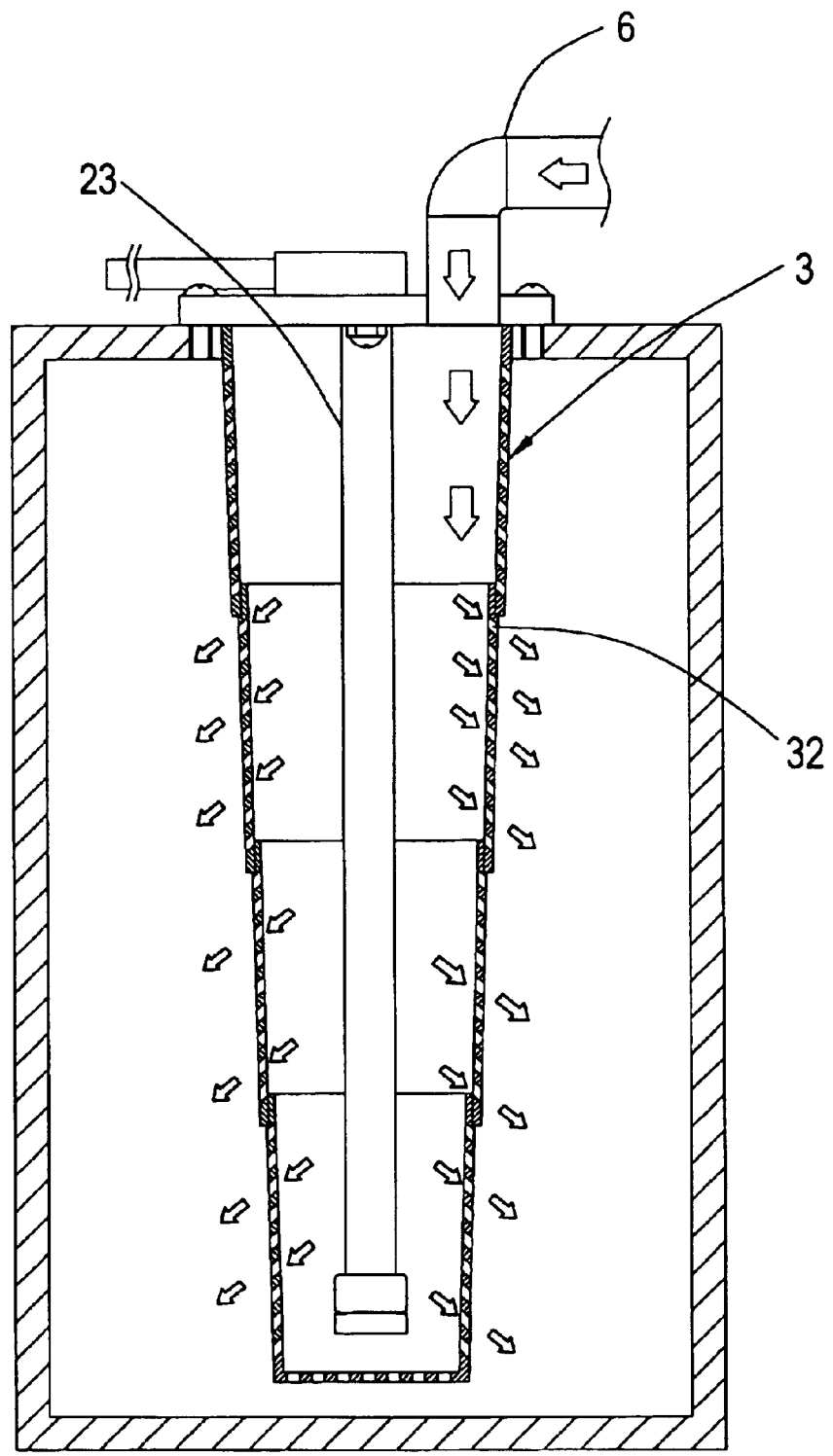
FIG. 7 is a practicing view showing the refined liquid level detector structure when being washed.

Please refer to FIG. 5 which illustrates a magnifying view showing a portion of the refined liquid level detector structure. As shown in FIG. 5, there are inclined openings 32 averagely mounted on the external casing 3. Hence, when under detecting, as shown in FIG. 6, the inclined openings 32 will not block the passage of the fluid 8 but simultaneously avoid the foreign particle 9 from entering the external casing 3 which may damage the probe 23. Then, when under washing, as shown in FIG. 7, the inclined openings 32 can easily and quickly drain the water from the inside of the casing 3 as water is inputted from the conduit 6 to wash the inside of the casing 3 and the probe 23.

Figure 8C:
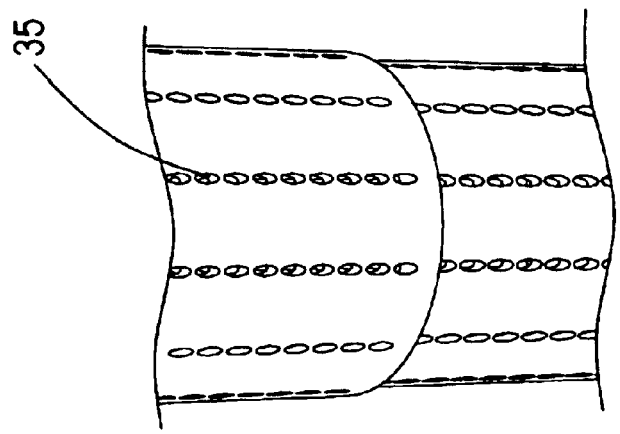
FIGS. 8(a)—(c) show patterns of inclined openings on the external casing of the refined liquid level detector structure.
Figure 8B:
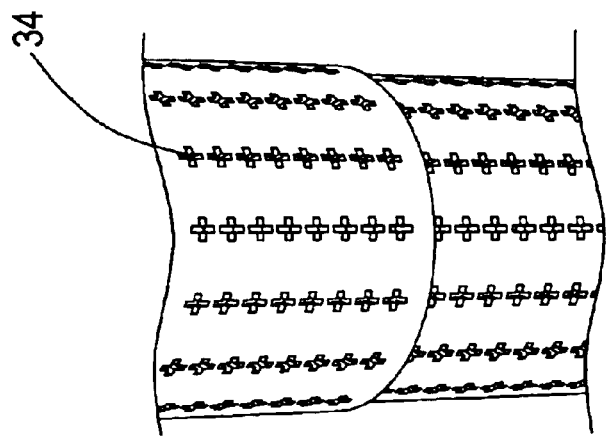
Figure 8A:
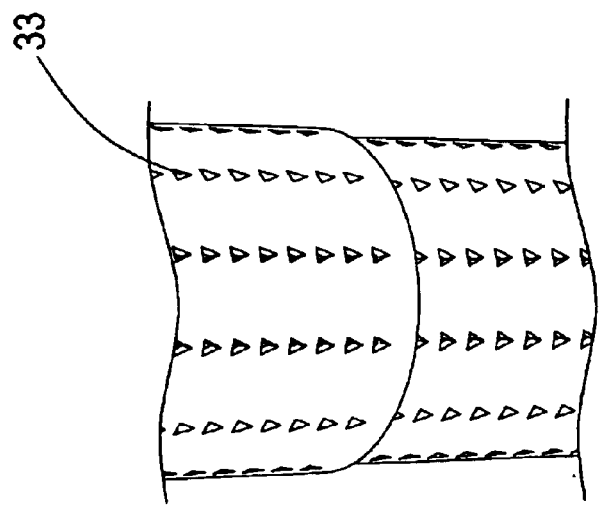

Please refer to FIGS. 8(a)—(c) which illustrate the styles of the inclined openings on the external casing of the refined liquid level detector structure. As shown in FIGS. 8(a)—(c), the styles of the inclined openings which are averagely disturbed on the external casing can be varied according to different measuring troughs or liquids, beside being a circular type, for example, triangular openings 33, crisscross openings 34 and elliptic openings 35 etc.

The refined liquid level detector structure according to the present invention, when being compared with the other prior arts, further includes the advantages as follows:

1. The refined liquid level detector structure according to the present invention provides an external casing which has a telescopic structure and is assembled by plural tubes sleeving on each other so that the user can adjust it to accommodate to a length of a probe.
2. In the refined liquid level detector structure according to the present invention, the external casing has inclined openings averagely mounted thereon to stop foreign particles from entering thereof and avoid the probe of the liquid level detector from being damaged.
3. The refined liquid level detector structure according to the present invention can be matched with all kinds of probe-type liquid level detectors.
4. The refined liquid level detector structure according to the present invention can solve difficulties of assembling for the user, loadings of processing and cost for the manufacturer, and pressures of displaying and stocking for the retailer.
5. In the refined liquid level detector structure according to the present invention, the inclined openings on the external casing can have different styles for conforming to different measuring troughs and liquids.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A refined liquid level detector structure comprising a liquid level detecting element and a telescopic external casing;

wherein said liquid level detecting element at least comprises a circuit device, a holder and a probe, said holder having plural fixing holes and a water inlet mounted thereon, said probe being set at a facet of said holder and said circuit device being set on another facet thereof;

and said telescopic external casing being assembled by plural tubes which are sleeved on each other and having a length of the telescopic external casing being adjustable according to the length of said probe, and each of said plural tubes having inclined openings formed therein and plural lugs mounted on an external tube thereof for passing a fixing element therethrough which is fixedly secured to said fixing hole of said holder.

2. The refined liquid level detector structure as claimed in claim 1, wherein said water inlet is secured by a screw or a conduit with a screw.

3. The refined liquid level detector structure as claimed in claim 1, wherein said liquid level detecting element is a liquid level detecting element with different probe styles.

4. The refined liquid level detector structure as claimed in claim 1, wherein said fixing hole is a tapped hole.

5. The refined liquid level detector structure as claimed in claim 1, wherein said fixing element is a screw.

6. The refined liquid level detector structure as claimed in claim 1, wherein said inclined openings of said external casing have different styles corresponding to different measuring troughs or liquids.

7. The refined fluid level detector structure as claimed in claim 6, wherein said styles of said inclined openings are circular, triangular, crisscross, or elliptic.

* * * * *